United States Patent [19]
Fohl

[11] 3,851,835
[45] Dec. 3, 1974

[54] WINDING-UP DEVICE WITH AUTOMATIC LOCK FOR SAFETY BELT

[76] Inventor: Artur Fohl, Schelmenwasenstr. 68, 7061 Haubersbronn, Germany

[22] Filed: May 3, 1972

[21] Appl. No.: 250,010

[30] Foreign Application Priority Data
May 5, 1971 Germany............................. 2122419
Dec. 22, 1971 Germany............................. 2163732

[52] U.S. Cl. ............................................ 242/107.4
[51] Int. Cl............................................ B65h 75/48
[58] Field of Search............... 242/107; 280/150 SB; 297/386–388

[56] References Cited
UNITED STATES PATENTS
| | | | |
|---|---|---|---|
| 3,402,899 | 9/1968 | Wright............................. | 242/107.4 |
| 3,415,462 | 12/1968 | Barecki........................... | 242/107.4 |
| 3,416,747 | 12/1968 | Stoffel............................. | 242/107.4 |
| 3,442,467 | 5/1969 | Stoffel............................. | 242/107.4 |
| 3,478,981 | 11/1969 | Barecki........................... | 242/107.4 |
| 3,482,799 | 12/1969 | Wrighton......................... | 242/107.4 |
| 3,632,058 | 1/1972 | Stoffel............................. | 242/107.4 |

*Primary Examiner*—John W. Huckert
*Assistant Examiner*—Jon W. Henry
*Attorney, Agent, or Firm*—Walter Becker

[57] ABSTRACT

The present invention relates to a winding-up device for a safety belt, which device comprises a shaft coupled to a return spring and having connected thereto one of the belt ends while being journaled in a housing serving as base frame. With normal movements of the user of said safety belt the belt is adapted to be wound onto and off said shaft. The winding device furthermore comprises a locking mechanism for locking the rotary movement of said shaft. This locking mechanism is adapted in response to a rotary acceleration effected in the pulling-out direction of the belt and exceeding a predetermined limit to effect an axial displacement caused by inertia forces on inclined surfaces, and to bring about a positive connection between the said shaft and the housing.

1 Claim, 27 Drawing Figures

WINDING-UP DEVICE WITH AUTOMATIC LOCK FOR SAFETY BELT

A winding-up device has become known according to which the shaft acting as belt spool or reel is provided with annular flanges at least one of which is located opposite a pressure plate and is coupled thereto by balls acting as inertia masses. The receiving portions in oppositely located surfaces of the flanges and the pressure plate for receiving said balls are provided with inclined surfaces which ascend in circumferential direction and which press the pressure plate and the annular flange away from each other in response to an acceleration exceeding the predetermined limit value when pulling out the belt. As a result thereof a gear ring provided on the other end face of the pressure plate is brought into engagement with a counter gear ring on the housing. This heretofore known winding device, however, not only has a considerable weight and relatively large dimensions, but is also expensive to produce inasmuch as the two gear rings at the end faces and the pocket recesses serving for receiving the coupling balls will work with sufficient precision only after they have been carefully mechanically machined.

It is, therefore, an object of the invention to provide a winding-up device of the above mentioned general type which will comprise as few as possible elements which can be produced by simple mechanical machining operations, and which has a low weight and will be able in locked condition to withstand a pull load which may exceed 1,200 kilopounds.

These and other objects and advantages of the invention will appear more clearly from the following specification, in connection with the accompanying drawings, in which.

Figure 5:
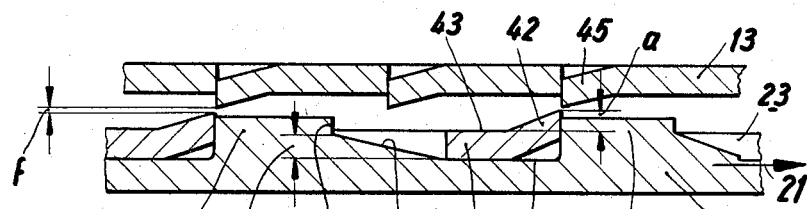
Figure 6:
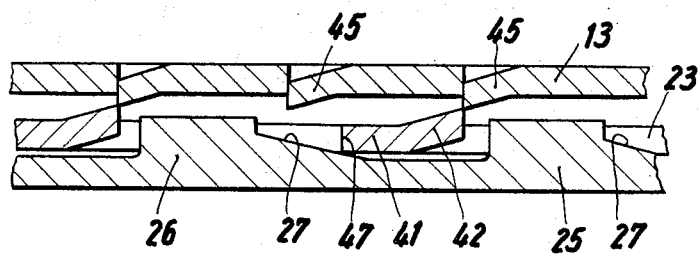
Figure 7:
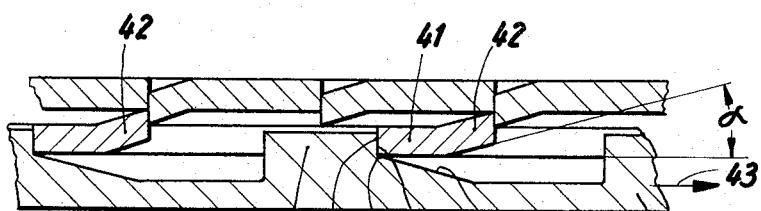

FIGS. 5 – 7 respectively illustrate different positions of the locking device pertaining to the winding device according to the invention until the locking effect occurs.

Figure 8:
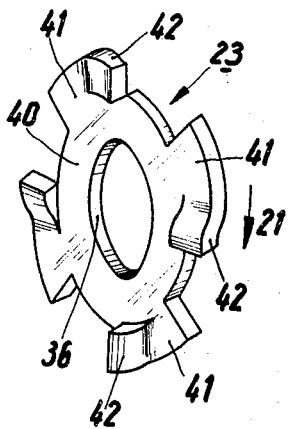

FIG. 8 illustrates a perspective view of the inertia disc of the winding device according to FIGS. 1 – 4.

Figure 9:
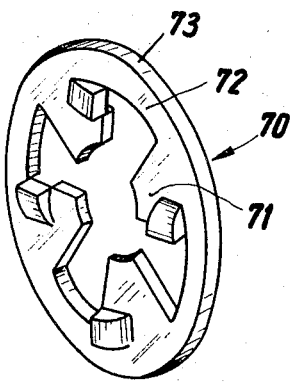

FIG. 9 shows a modified inertia disc for centering from the outside.

Figure 10:
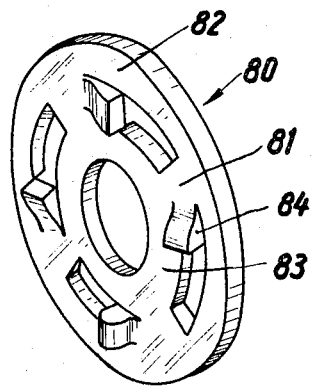

FIG. 10 illustrates a further modified form for an inertia disc, likewise in perspective.

Figure 3:
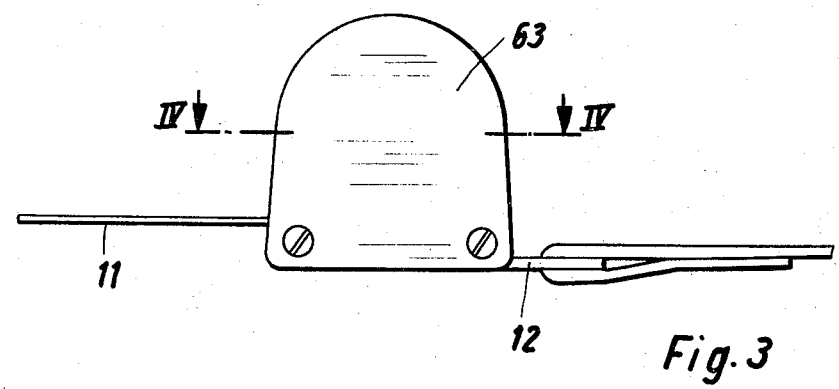
FIG. 3 is a side view of the winding device according to the invention.
Figure 11:
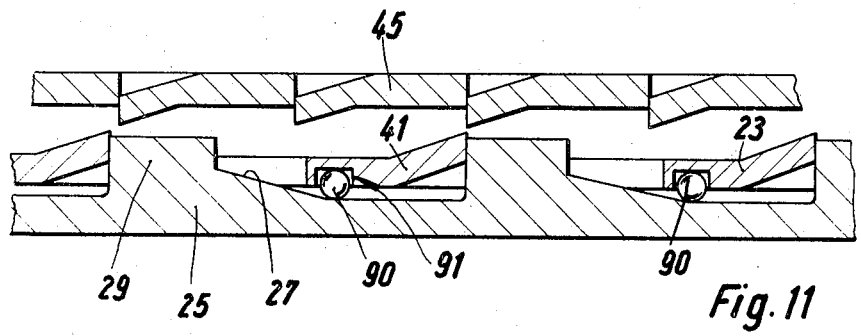

FIG. 11 illustrates similar to FIG. 3 a second embodiment of the invention, and more specifically, a development thereof, in which the inertia disc, for purposes of reducing the friction is equipped with rolling bodies relative to the supporting disc.

Figure 4:
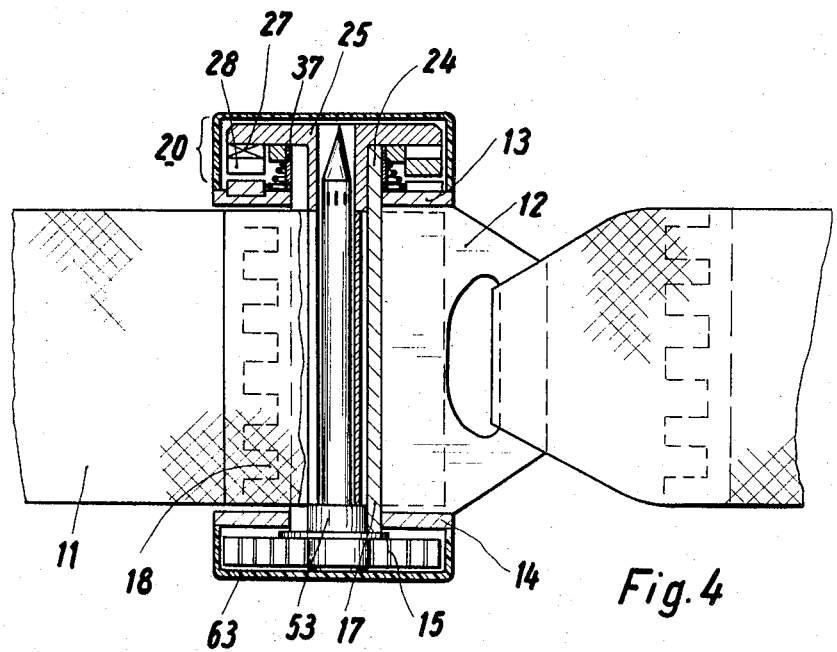
FIG. 4 represents an axial longitudinal section taken along the line IV—IV of FIG. 3.
Figure 12:
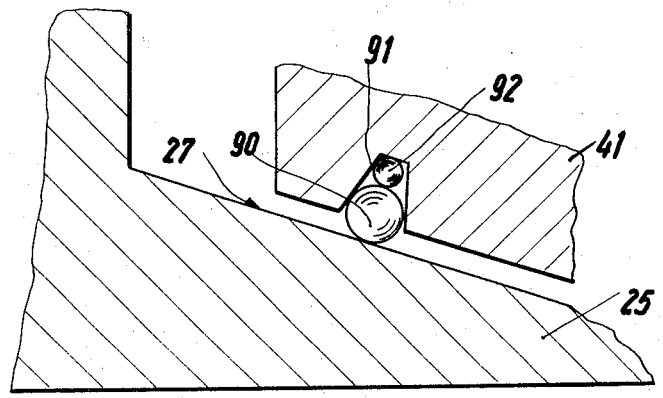

FIG. 12 shows similar to FIGS. 3 and 4 on an enlarged scale in the form of a cutout a third embodiment of a device according to the invention, in which the inertia disc is by two balls provided in a recess supported on an inclined surface of the supporting disc.

Figure 13:
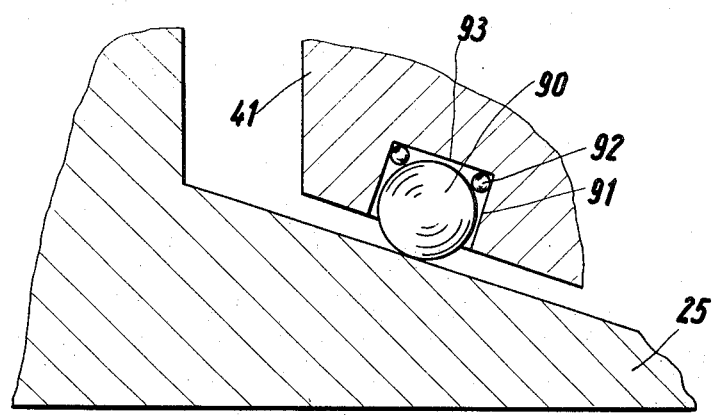

FIG. 13 is a fourth embodiment in a similar illustration according to which the inertia disc by means of roller bodies rests against the supporting disc, which roller bodies in their turn in the manner of thrust bearings are supported by small intermediate balls.

Figure 14:
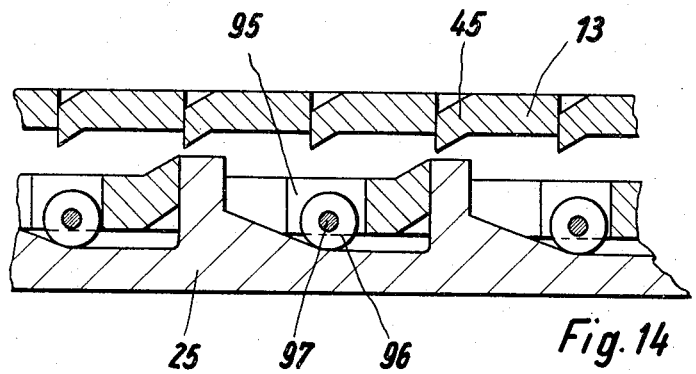

FIG. 14 illustrates a fifth embodiment of the invention according to which the inertia disc is supported by small discs relative to the supporting disc.

Figure 15:
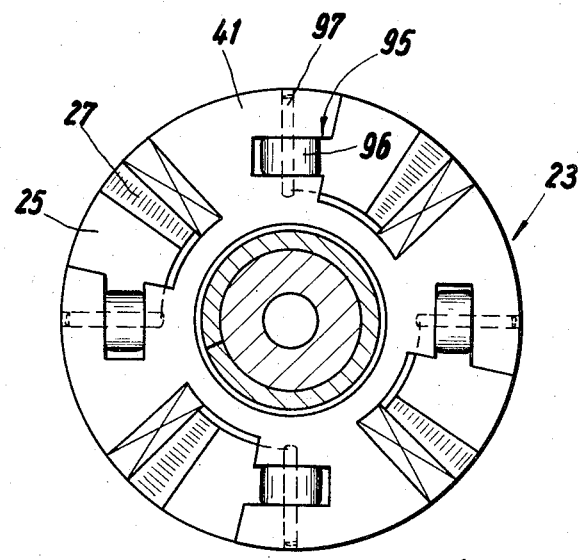

FIG. 15 is an axial view of the supporting disc according to FIG. 14.

Figure 16:
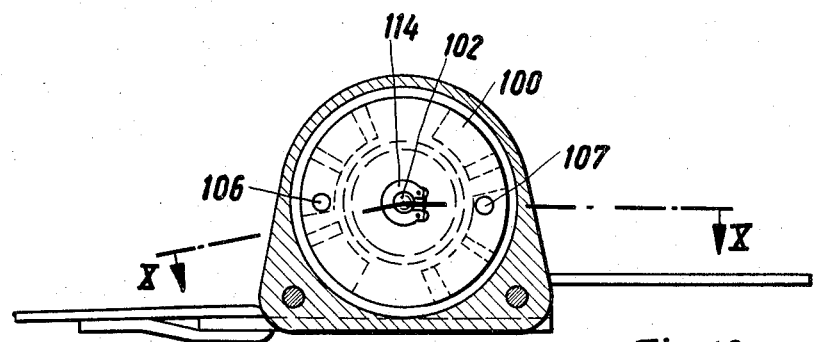

FIG. 16 shows as sixth embodiment of the invention an axial cross section through a position-independent winding device.

Figure 17:
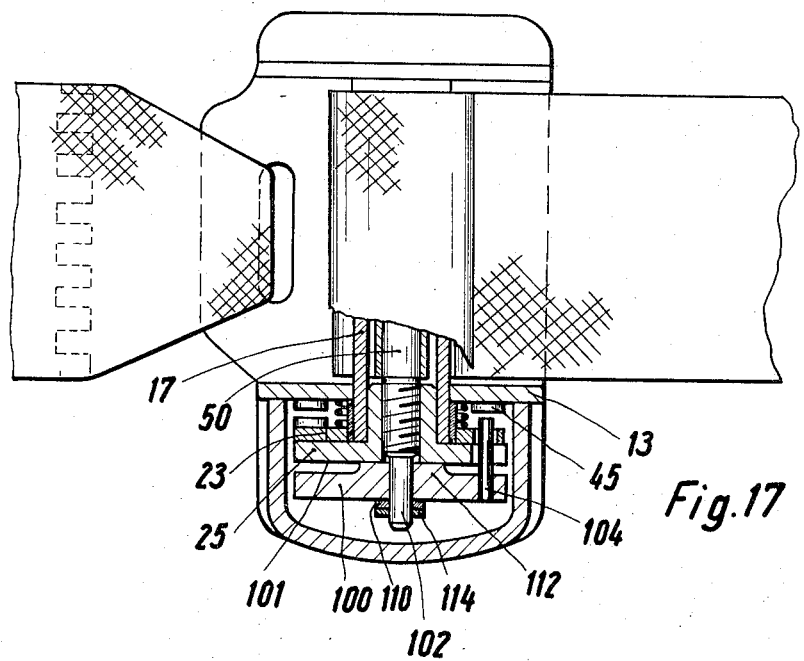

FIG. 17 illustrates the embodiment of FIG. 16 partially in top view and partially in axial longitudinal section.

Figure 18:
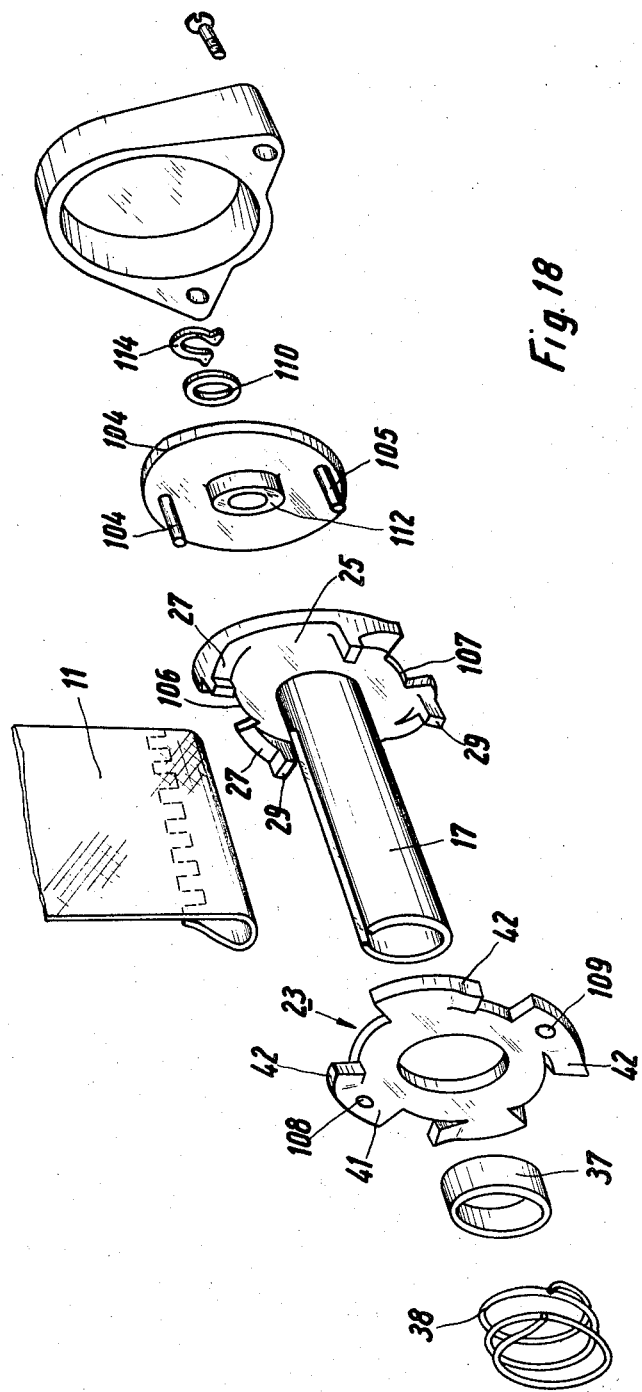

FIG. 18 is an exploded view of the device according to FIG. 16.

Figure 19:
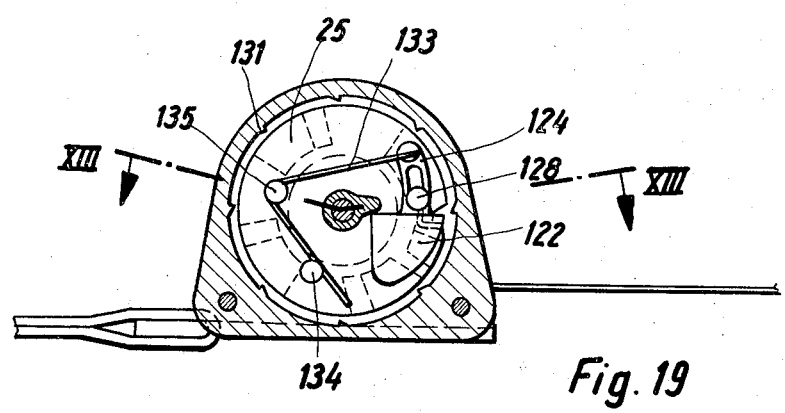

FIG. 19 shows a seventh embodiment of a winding device according to the invention which with regard to the device of FIGS. 16 – 18 is additionally provided with a control device in a cross section corresponding to FIG. 16.

Figure 20:
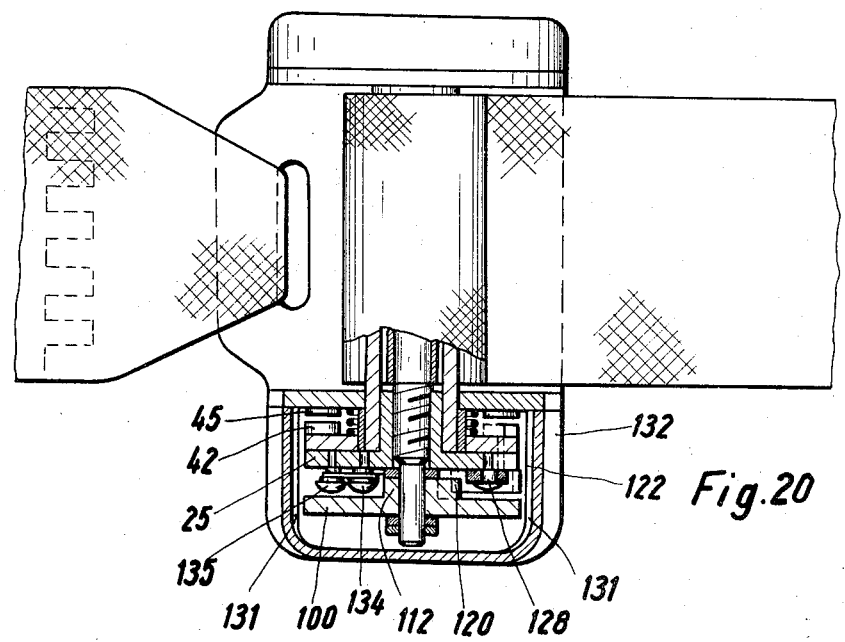

FIG. 20 shows the device of FIG. 19 in top view and partially in longitudinal section.

Figure 21:
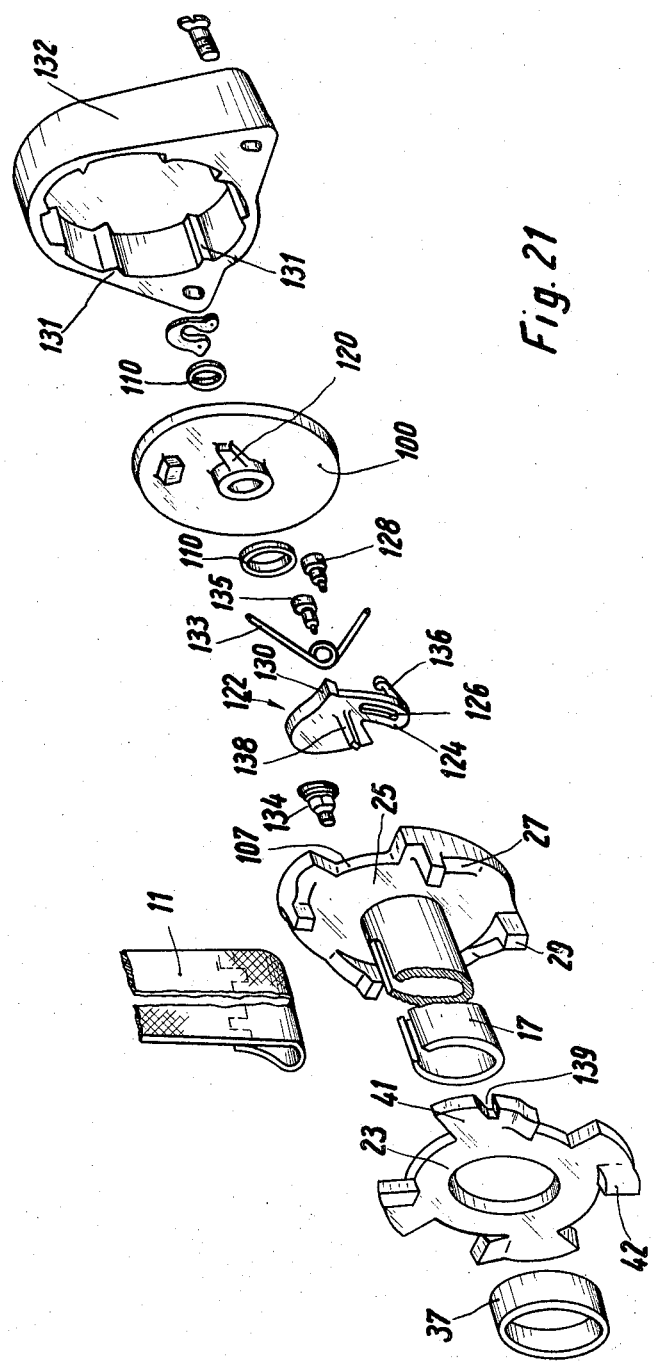

FIG. 21 is an exploded view of the embodiment of FIG. 20.

Figure 22:
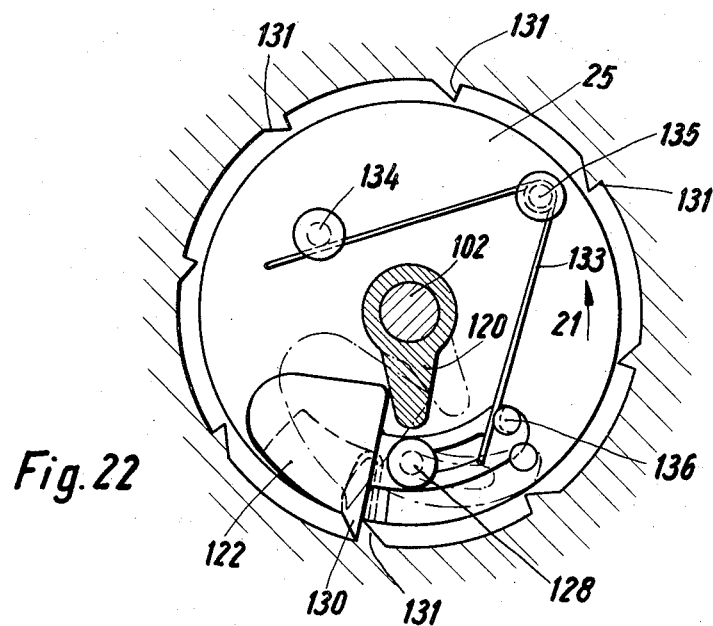

FIG. 22 is an axial top view of the back side of the supporting disc of the device of FIG. 19 in a position in which its additional control member is already engaged and initiates the displacement of the inertia disc.

Figure 23:
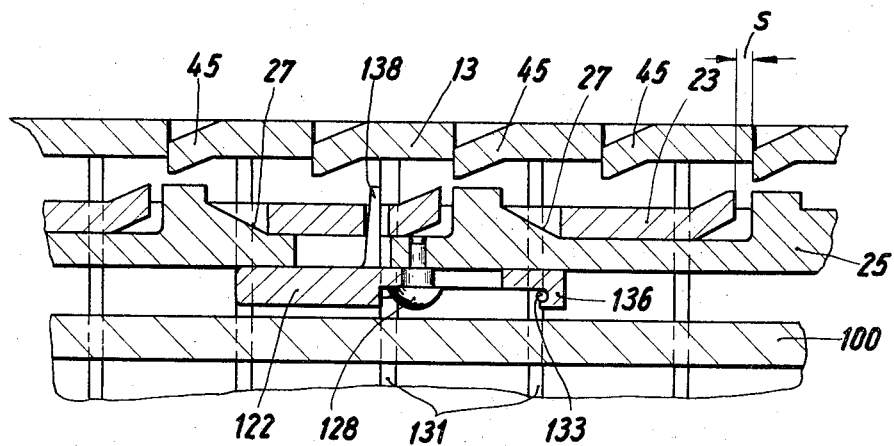

FIG. 23 illustrates in a manner similar to FIG. 11 a development of an inertia disc, of the supporting disc, and the stationary engaging noses directly prior to the start of the control operation.

Figure 24:
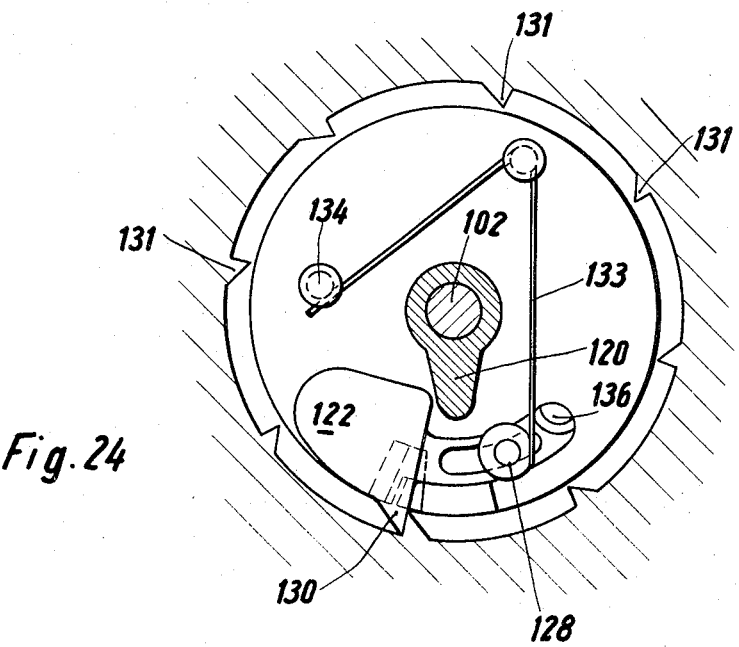

FIG. 24 illustrates an axial view similar to that of FIG. 15 of the device of FIG. 19 at the end of the axial movement of the inertia disc, but prior to the occurrence of the locking device.

Figure 25:
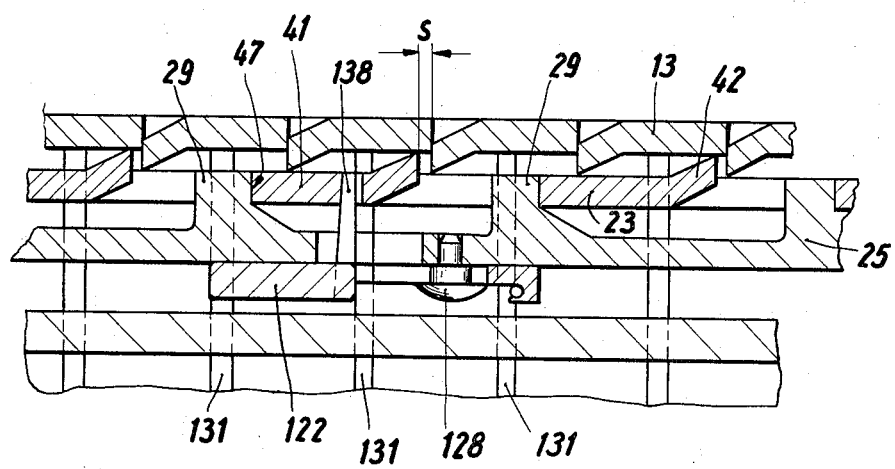

FIG. 25 shows the device of FIG. 19 in the form of a development similar to that of FIG. 23.

Figure 26:
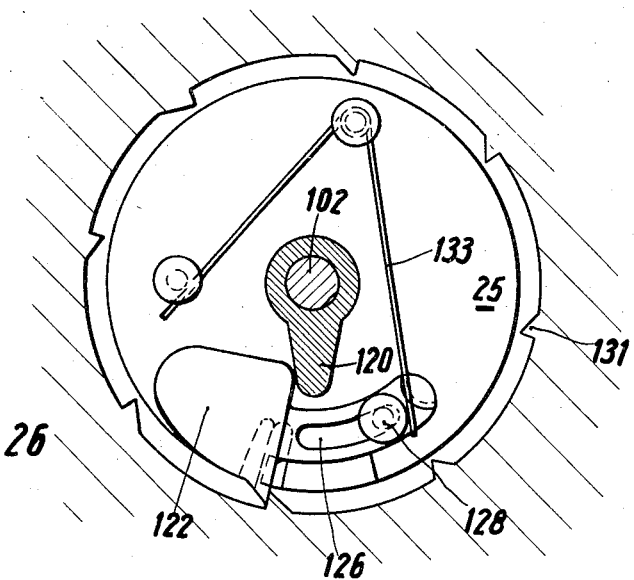

FIG. 26 shows the device of FIG. 19 in a locking position in a view similar to that of FIGS. 22 and 23.

Figure 27:
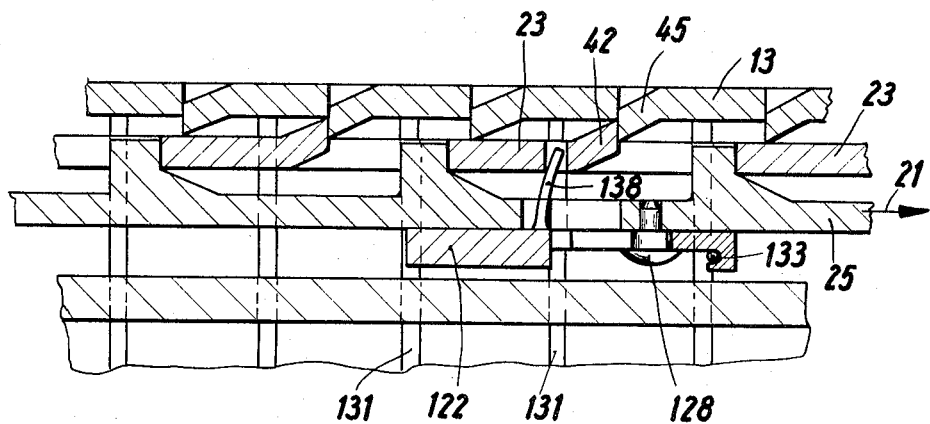

FIG. 27 shows the device of FIG. 19 in locking position in the form of a development which corresponds to FIGS. 23 and 25.

The winding device according to the present invention is characterized primarily in that between a housing wall for journaling the spool shaft on one hand, and a supporting disc fixedly located on the shaft end protruding from the housing there is provided a loosely mounted inertia disc, said supporting disc comprising a plurality of axial cams which have their inclined surfaces ascend in a direction counter to the pulling-out direction. The said inertia disc comprises two, preferably three or more radially extending arms and in response to exceeding the limit value slides with its arms on said inclined surfaces whereby it is axially displaced and passes into the range of arresting noses located on the outside of the housing wall, and finally by means of its arms acting as locking means rests on one hand against said noses and on the other hand against the respective abutments at the ends of the axial cams.

In this arrangement according to the invention, the inertia disc which responds to critical acceleration values is simultaneously employed as mechanical lock which is properly supported without the possibility that any material bending forces can occur. The positive connection of the abutments on the supporting disc with the arresting noses on the housing is rather effective through the intervention by the pressure subjected arms of the inertia disc which for purposes of absorbing the high pulling forces acting on the safety belt in axial direction has to have only a slightly bulging cross section and consequently permits of the supporting disc being located closely to the housing wall which in turn, according to a further development of the invention allows a star-shaped design for the inertia disc. The annular zones between the arms of the inertia disc merely serve to hold these arms in the intended uniform distribution over the circumference of the disc the same are subjected neither to pull nor to pressure, and consequently afford the possibility of designing such annular zones as parts made of pressed synthetic material. In order to assure a complete engagement of the arms over their entire axial cross-sectional width and to have to select the axial displacement stroke only slightly longer than said width, it is suggested according to a further development of the invention to provide the arms of the inertia disc with locking teeth bent out of the disc surface which teeth in the pulling-off direction stand off relative to the housing wall provided with the locking noses. Inasmuch as the annular zones of the inertia disc which are provided between the arms merely for spacing purposes are during the locking operation not subjected to mechanical forces, it is possible to approved a closed circular im for the inertia disc and to guide the inertia at said rim by means of an outer centering section. A particularly simple arrangement, however, is obtained when the inertia disc has a central bore by means of which it is with a loose seat inwardly centered and guided on the spool shaft or relative to the spool shaft. Regardless of whether an outer centering or an inner centering portion is selected for the inertia disc, the design of the locking device according to the invention permits the manufacture of the inertia disc by punching the disc out.

For a safe function of the winding device and its locking device it is of foremost importance that the high pull stresses in the belt as they occur during critical accelerations, for instance, during a full braking operation or during an impact upon an obstacle can be safely transferred or conveyed to the supporting disc equipped with abutments. Although for a fixed connection between the spool shaft and the supporting disc, various possibilities of a positive connection are available, it is suggested to effect this connection by hard soldering or welding. Such soldering or welding connection permits the possibility to provide structurally simple and from a manufacturing standpoint economical solutions for the spool shaft and also for the supporting disc. Above all, such hard soldering or welding connection makes it possible that the supporting disc, according to a further development of the invention can be produced in a chipless manner, and more specifically as a sintered part, as a high quality casting or as a pressed part. For the suggested soldering or welding connection it is particularly advantageous when for connecting the supporting disc to the spool shaft there is provided a connecting stud on which a follower nose is mounted for the spool shaft.

According to a preferred embodiment of the invention, the spool shaft is designed as a hollow shaft. The spool shaft may then advantageously consist of a rolled sheet metal piece with which expediently the longitudinal edges of said sheet metal piece are located in spaced relationship to each other and opposite each other so as to form a longitudinal slot into which one belt end may be introduced and which may be used for a subsequent connection in the inner hollow chamber of the spool shaft. For gently treating the safety belt protruding from said longitudinal slot it is suggested that the edges of the spool shaft are provided with interruptions along said longitudinal slot or are embossed.

Inasmuch as when exceeding the critical limit value for the rotary acceleration, considerable pulling forces may occur in the belt when the locking device becomes effective, it is expedient for safeguarding the above mentioned pulling forces which may reach up to 1,200 kp and more, when according to a further development of the invention to journal the two end sections of the spool shaft in bores serving as bearings and respectively provided in said two housing walls. The above mentioned design of the spool shaft in the form of a hollow shaft affords the possibility of providing a connecting bolt which extends through the spool shaft and holds together the entire winding-up device and its locking device in axial direction and which, above all, may be used for axially arresting the spool shaft. To this end the connecting bolt is expediently provided with a head outside the housing which head is adapted to be coupled to the return spring. As a result thereof a very advantageous arrangement can be obtained by means of which between the two housing walls extending vertically with regard to the axis of rotation of the spool shaft, merely the belt is provided and latterally passed through these walls, whereas the locking device according to the invention is located outside the housing in the immediate vicinity of one of the two housing walls while the return spring is likewise located outside the housing wall in the direct vicinity of the other housing wall where it can be covered by a simple cap which may be designed as a deep drawn part or as a pressed part of synthetic material.

In order to assure that the spool shaft is journaled in a buckle and bend-resistant manner in the housing walls which preferably are only relatively thin, it is suggested according to a further development of the invention that the head of the connecting bolt is provided with an extension dimensioned in conformity with the free inner diameter of the hollow shaft. This extension will within the range of one of the bearing areas for the spool shaft fill in the inner hollow chamber of the spool shaft and thus will yield a massive supporting zone. In this way it will be possible to decrease the outer diameter of the spool shaft and consequently to increase the belt length to be stored within the housing without changing the outer diameter thereof. The same purpose is served by the tendency so to design the connection of the belt to the spool shaft that the connecting area will bulge as little as possible in radial direction. To this end, according to a further development of the invention it is provided that the connecting end of the belt is folded to form a loop and with this loop is introduced into the longitudinal slot of the hollow spool shaft, and that the thus obtained seat of the belt will be secured by having the shaft of the connecting bolt extend through that portion of the belt loop which is located within the spool shaft. By a suitable selection of the diameter of the shank of the connecting bolt it is possible without difficulties to assure that the belt is additionally clamped in radial direction between the shank and the inner wall of the spool shaft so that a better distribution of the pull load stresses will be obtained. For holding the winding-up and the locking device together it is advantageous to have the shank of the connecting bolt extend into the range of the supporting disc and frictionally or positively connect said shank with said supporting disc. In order to facilitate the introduction of the shank into the loop of the belt and during the assemblying to safely mount the supporting disc on the connecting bolt, the shank of the connecting bolt may have its end tapered, especially pointed. The connection may be materially facilitated by connecting the supporting disc according to a further development of the invention to a central extension which is directed toward the housing. This extension is inserted into the hollow chamber of the spool shaft and extends at least into the region of the bearing area in the adjacent housing wall. In this way there is obtained the additional advantage that the spool shaft can within the region of its second bearing area likewise be considered so and will as to its mechanical load act in such a manner as if it were designed as a massive part.

According to a further development of the structural possibilities outlined above the extension of the supporting disc may comprise a central longitudinal bore into which the shank end of the connecting bolt is press fitted. For securing the press fit, the shank end of the connecting bolt may form a type of slotted or notched pin and therefore may at its connecting zone in its longitudinal direction be provided with notches which increase the non-rotational connection to the insert of the supporting disc or to the supporting disc itself.

For assembling the winding-up device for the first time and for a possibly later replacement of the safety belt by a new belt it is advantageous to design the bores intended as bearings for the spool shaft in the housing walls with identical bore diameters. The structurally necessary spacing between the supporting disc and the pertaining housing wall may in this instance advantageously be assured by providing a spacer sleeve which is placed onto the spool shaft and is located between the supporting disc and the oppositely located housing wall. The inertia disc may in such an instance be journaled with loose fit directly on the spacer sleeve in which connection it is advantageous to produce the spacer sleeve of synthetic material, especially of a synthetic material with a low friction coefficient.

In order to assure an easier disengagement of the locking device, a pressure spring may be provided in a manner known in connection with locking devices for safety belts. This pressure spring is arranged between the housing wall provided with arresting noses on one hand and the inertia disc on the other hand and may advantageously be conical.

In addition to the above outlined features, there exists the requirement to make the limit value of the rotary acceleration at which the inertia disc becomes effective as a lock and prevents a further rolling-off movement of the spool shaft, independent of the respective location of the winding-up device. The reason for this consists in that it has been found that, for instance, in a position of use of the winding-up device in which the axis of rotation of the spool shaft and consequently also of the coaxially arranged inertia disc extends vertically, the limit value or the responding value for the rotary acceleration lies considerably higher than with such positions of use in which the axis of rotation of the spool shaft extends horizontally. This is true if in the time of danger the inertia disc with vertically located axis of rotation of the spool shaft has to be accelerated in upward direction. Inversely, great lower responsive values are obtained when the inertia disc in its position of use is located above the arresting noses and when consequently the mass forces of the inertia disc favor their engaging possibilities with the arresting noses therebelow.

In order to reduce the sensitivity of location of the winding device, it is provided that the mass inertia forces acting in the direction of rotation are increased relative to the mass inertia forces for the axial displacing movement of the inertia disc acting as locking member. This can be realized according to a further development of the invention by dimensioning the final height of the inclined surfaces of the supporting disc, said height being measured in axial direction, so that it will be smaller than, or the same height as the axial extension of the locking teeth on the inertia disc as measured relative to the disc surface of the inertia disc. It is particularly advantageous to confine the locking teeth of the inertia disc by an end face which forms an abutment surface at the arresting noses, at least approximately parallel to the axis of the spool shaft and of the inertia disc.

For purposes of improving the ratio between the frictional forces occurring during the start of movement of the inertia disc on the inclined surfaces of the supporting disc on one hand and the inertia surfaces acting in axial direction on the other hand, it is suggested in conformity with a further development of the invention that rotatably mounted rolling bodies are arranged on the inertia disc which rolling bodies roll on the inclined surfaces of the supporting disc when the limit value of the rotary acceleration has been exceeded.

According to a preferred embodiment of the invention, the rolling bodies are formed by balls. Advantageously, each of the balls may be arranged and guided in a depression or a recess, especially in a bore of the supporting disc. In order to reduce the friction relative to the inertia disc as it occurs during the rolling movement of the rolling bodies, it is advantageous according to a further development of the invention to provide at least two balls in each of the depressions for the rolling bodies. According to a particularly advantageous design according to the invention it may be provided that the balls arranged in a common depression have different diameters. Similar to the well-known thrust bearings a particularly low friction and consequently a high responsive sensibility of the inertia disc may be assured by providing in each depression or recess at least two, preferably three or more balls of smaller diameter and one ball of greater diameter which through the smaller diameter balls practically friction-free rests against the supporting disc. According to a further feature of the invention the rolling bodies may be provided in recesses in radially extending arms of the supporting disc.

With a winding device according to the present invention difficulties may be encountered when the underwriters conditions of individual countries require that the winding device has a limit value of the withdrawal acceleration which is independent of the position of use of the winding device at which limit value the winding device is automatically blocked. The response sensitivity of the winding device according to the invention is primarily influenced by the starting position of the inertia disc. If with an about vertical position of use of the axis of rotation of the spool shaft the inertia disc is supposed to reach its locking position, it very much depends on whether the inertia disc is located above or below the stationary arresting noses which cooperate with the inertia disc. Inasmuch as the pressure spring acts in a direction counter to the engaging movement of the inertia disc into the locking position, it will be appreciated that with the arrangement initially mentioned the limit value of the withdrawal acceleration of the belt as it is necessary or the initiation of the locking movement or of the rotary acceleration of the spool shaft is considerably lower when the inertia disc is located above the arresting noses than is the case when the inertia disc occupies a position turned by 180° about the horizontal representing the second extreme position in which it is located below the arresting noses and consequently against the thrust of the pressure spring can only at higher speed values reach the engaging and blocking position with the arresting noses.

For purposes of obtaining a location-independent response sensitivity of the winding device, according to a further development of the invention, an additional mass disc is provided which is in operative connection with the inertia disc and is arranged on that side of the supporting disc which faces away from the inertia disc and is rotatable under rather low friction. Advantageously, the additional mass disc may be rotatably journalled on a pivot which pivot is coaxially connected to the supporting disc. In order to reduce the above mentioned influence of the weight of the inertia disc upon the response value of the locking device or to eliminate the influence of the weight alltogether, it is possible according to the present invention, between the additional mass disc and the supporting disc, to provide a hub the end face of which will with a vertical spool shaft support the additional mass disc with regard to the supporting disc when the additional mass disc in one of these two vertical positions of use is located above the supporting disc and then determines the frictional follower moment between the additional mass disc and the supporting disc.

Furthermore, at the end of the pivot there is provided a follower ring which is engaged by the additional mass disc when the latter occupies its other vertical position of use below the supporting disc. Since the additional mass disc is in both extreme positions taken along primarily by the friction moment between the supporting disc and the inertia disc in the first extreme position and by the friction moment between the additional mass disc and the follower ring in the second extreme position, the two diameters of the hub and of the follower ring may be dimensioned relative to each other in such a way that the influence of the weight of the inertia disc upon the limit acceleration values is compensated for or nearly compensated for. To this end, according to a further feature of the invention, it is provided that the outer diameter of the hub is considerably greater than the diameter of the follower ring. A particularly simple solution is obtained when the hub is connected to the additional mass disc, especially forms a single integral piece therewith. Advantageously, the arrangement may be such that, according to a further development of the invention, in the vicinity of the circumferential zone of the supporting disc there is provided at least one follower which couples the additional mass disc to the inertia disc in the direction of rotation while advantageously a slight follower play may be provided in the direction of rotation. To this end, the follower may advantageously be designed as a pin which is in an axis parallel manner fixedly arranged in the additional mass disc, the pin engaging the inertia disc. Since generally there is the tendency to take full advantage of the diameter of the supporting disc for the inclined surfaces which serve for controlling the inertia disc, while on the other hand in view of the better handling the outer diameter of the winding device has to be limited, it is advantageous at the circumference of the supporting disc to provide a recess through which the follower pin extends.

In the just described design of the winding device, a certain difficulty may be encountered due to the fact that for all individual elements relatively narrow tolerances have to be observed during the manufacturing process of the device. If, namely, the radial play between the spool shaft and the inertia shaft with regard to the arresting noses arranged on one of the two housing walls has been selected too high, occasionally during the engaging movement of the inertia disc the arresting noses may be moved beyond the intended point so that only one arresting nose of the inertia disc will engage a stationary arresting nose, whereas the remaining arresting noses will slightly jam. In order to prevent such a situation and to assure a safe locking function, it is therefore necessary by suitable narrow tolerances to limit the necessary radial play.

In order during the manufacture of the individual parts of the winding device to be able to admit greater tolerances without sacrificing the safety of function, and in order to prevent the above described moving of the arresting noses and blocking noses beyond the desired point, it is suggested according to the present invention that the inertia disc serve as locking element and will following the exceeding of the limit acceleration of the spool shaft be displaced in axial direction to such an extent that its locking noses will be located in front of the arresting noses on the housing but will still require a short residual turning before they reach the arresting noses. In view of this required residual turning, the still prevailing engaging play of from 0.5 to 1 mm will then be overcome by a slight further pulling out of the belt and only then the locking position will be reached. In contrast to the above described embodiment, the locking process can thus be initiated by having the inertia disc first cause its locking noses to engage the stationary arresting noses before it is axially displaced into the final blocking position. The basic principle of the further development of the invention consists primarily in obtaining an axial displacement of the inertia disc already prior to the locking noses of the inertia disc engaging the stationary arresting noses. With such a design of the winding device according to the invention it is provided that the additional mass disc comprises at its end face which faces the supporting disc a control cam for a control member which with regard to the axis of rotation of the spool shaft and the supporting disc is radially disengageable and is additionally displaceable on the supporting disc in circumferential direction.

Furthermore, a cover housing is provided for the supporting disc, the control member and the additional mass disc. This cover housing has its inner wall provided with toothed strips or racks which cooperate with the control member and which have a pitch corresponding to that of the stationary arresting noses. In order to realize a position-independent response sensitivity which is independent of the return force of the spring and the preload thereof, the control member may, according to a further development of the invention be provided with a spring-elastic finger which is parallel to the axis of rotation of the spool shaft and which engages the inertia disc through a recess in the supporting disc and holds the inertia disc stationary relative to a further rotating supporting disc in order to initiate a locking operation.

Referring now to the drawings in detail, the winding-up device according to FIGS. 1 - 4 is intended for a safety belt 11 and comprises a housing 12 bent into a U-shape from a flat iron and forming a basic frame. Between the side walls 13 and 14 of the housing 12, the non-required portion of the belt is, by means of a returning spring 15 rolled to a roll 16 shown in FIG. 1. As a core for said roll there is provided a tubular spool shaft 17 which is rolled out of a rectangular metal strip. Spool shaft 17 has its end sections journaled in a manner described further below in the two side walls 13 and 14. The spool shaft receives that end of belt 11 which is folded into a loop 18. This arrangement will assure that the belt is able to roll off from the roll 16 against the pulling force of the return spring 15 when the user bends forwardly and thereby exerts a pull on the belt 11. When the user leans backwardly, the belt 11 is automatically on the roll 16 wound up to maintain a sufficiently tight fitting of the belt.

The device according to the invention furthermore comprises a locking or blocking device 20 which brakes the rotary movement of the spool shaft 17 and thereby the rotary movement of the roll 16. The device 20 is arranged on the outside of the housing wall 13 and is covered by a cap 19 formed or deep drawn of sheet metal or it is made of synthetic material. The locking device is intended to establish a positive connection between the spool shaft 17 and the housing 12 in order thereby to prevent a further winding off of the belt 11 when during a braking operation at a high rate of retardation, or during an accident the use drops into the belt and thereupon in the direction of the rolling-off movement (said direction being indicated by an arrow 21) a rotary acceleration occurs which exceeds a predetermined limit value. More specifically, the locking device according to the invention comprises an inertia disc 23 for ascertaining an unduly high rotary acceleration. This disc 23 is loosely mounted on that section of the spool shaft 17 which protrudes on the housing wall 13 and due to its mass inertia will during a rotary acceleration fall back behind the spool shaft. At the free end section 24 of the spool shaft 17 there is provided a ball-shaped supporting disc 25 which comprises four axial cams 26 which ascent in the rotary direction that is opposite to the pull-out direction 21. The inclined surfaces 27 end at the radially extending end faces 28 which together with the axis of rotation of the supporting disc 25 and the spool shaft 17 are located in a common plane. These end faces belong to one of the four abutments 29. The supporting disc 25 is made in a chipless manner, for instance, as a sintered part, as a high-grade casting or as a pressed part. The supporting disc 25 has a connecting stud 30 which along its mantle surface carries a follower nose 31. This nose 31 of the follower stud 30 is introduced into the longitudinal slot 33 of shaft 17 which slot extends along the mantle line. The outer diameter 30 of nose 31 is selected in conformity with the hollow chamber diameter of the spool shaft 17. The longitudinal slot 33 is formed by the two oppositely located longitudinal edges 34 and 35 of the metal strip which edges are spaced from each other. The metal strip as mentioned above is formed into the spool shaft 17. The spool shaft 17 which has its end face in engagement with the supporting disc 25 is connected to the supporting disc 25 and the follower pin 30 of the supporting disc by hard soldering so that it is absolutely break resistant.

In the space between the supporting disc 25 and the housing wall 13, the inertia disc is with its central bore 36 inwardly centered and is loosely guided on a spacer sleeve 37 which consists of synthetic material with a low sliding friction coefficient as, for instance, teflon. This sleeve 37 has one of its end faces in engagement with the housing wall 13 while for securing the distance of the supporting disc 25 from said housing wall rests against the inner side of the supporting disc 25. Between the inertia disc 23 and the housing wall 13 there is provided a conical pressure spring 38 which has only a few helical windings and which continuously urges the inertia disc 23 against the supporting disc 25.

The inertia disc 23 illustrated on an enlarged scale in FIG. 8 is star-shaped and comprises four arms 41 which protrude radially from their annular zone 40 comprising the central bore 36. These arms are adapted in a manner described further below to act as locking members between the supporting disc 25 and housing wall 13 when the limit value of acceleration is exceeded. Each of these arms extends in the direction of the pulling-out rotary movement 21 into a cut locking nose 42. Locking nose 42 is spaced relative to the oppositely located housing wall 13 and as shown in FIGS. 5 to 7 is bent by a flat acute angle from the disc plane 43 illustrated in FIG. 7. Advantageously, the arms 41 with their engaging surfaces are so designed that the moment of the supporting force with the lever $h$ is at least approximately compensated for by the oppositely acting friction moment so that no material axial forces act upon the locking elements.

Within the region of the saw-tooth-shaped locking noses 42, embossed arresting noses 45 spaced from each other are provided on the oppositely located housing wall 13. These noses 42 form the counter bearings for the arms 41 acting as locking elements and the locking noses 42 thereof when in case the limit value of the rotary acceleration is exceeded, the locking condition is established. More specifically, this effected in the following manner:

When the belt 11 with its loop 18 is introduced into the longitudinal slot 13 and there the belt 11 connected in a manner described further below occupies a rest position, the position of the locking device is assumed which is illustrated in the cutout U of FIG. 5.

In this locking position the arms 41 of the inertia disc 23 are held by the pressure spring 38 at the bottom 46 of the cuts located between the two abutments 29. Since a small axial spacing between the arresting noses 45 of the side wall 13 and the abutments 29 of the supporting disc 25 is fixed by the spacer sleeve 37, the supporting disc 25 and together with the latter the belt roll 16 can carry out winding-up and winding-off movements without these two members positively engaging each other. Inasmuch as only low accelerations can occur with these rotary movements, the inertia disc 23 can be kept in the illustrated position by the pressure spring 38 and can carry out these rotary movements. However, as soon as the supporting disc 25 is greatly accelerated in the pull-out direction 21, the inertia disc 23 falls behind the supporting disc 25 while the rear edge 47 of the arm 41 passes onto the pertaining inclined surface 27 of the supporting disc as shown in FIG. 6. The greater the relative path of rotation between supporting disc and inertia disc 23 falling back due to its inertia force, the more will the inclined surface 27 in axial direction press against the housing wall 13, against the thrust of the pressure spring 38. As soon as in the position of FIG. 6 the blocking teeth 42 begin to contact the arresting noses 45, arm 41 is further displaced along the inclined surface 27 and is brought into full engagement of its locking nose 42 with the pertaining arresting nose 45. The rotary movement of the supporting disc 25 may be continued until finally the rear edge 47 of arm 41 moves against the end face 28 of the abutment 29 behind the inclined surface, in this instance practically with full cross section and rests with its other end of its locking nose 42 against the arresting nose 45 thereby acting like a locking member pressure loaded in its longitudinal direction. Inasmuch as the arresting noses 45 as well as the locking noses 42 are produced by stamping or punching and consequently similar to the end faces 38 of abutments 29 of the supporting disc 25 will with its axis of rotation be located in a common plane, it will be appreciated that in the locking position no axial component can be exerted by the pull of the belt. As long as this pull is maintained therefor, the locking position will remain. However, no axial forces can occur which could prevent the loosening of the locking device when relieving belt 11. A further advantage is seen in the fact that the spacing of the end face edge of the arresting noses 45 can be reduced from the end face 48 of the abutments 29 to a minimum fixed by the manufacturing tolerances. Furthermore, the bending moment occurring in case of an interlock and effective in the arms 41 can be kept extremely low so that already with small wall thicknesses of the arms 41 a loadability of more than 2,000 kp can be absorbed in the belt.

As soon as the belt 11 is again relieved, the inertia disc 23 is, by the pressure spring, pressed back against the supporting disc 45 in loosening direction while for the loosening operation it is favorable that in the locking position a slight axial play (indicated at 49 in FIG. 7) remains between the arm 41 and the inclined surface 27. Inasmuch as the inclination of the inclined surfaces 27 exceeds the angle within which self-locking occurs, the arms 41 will be able under the thrust of the spring 38 to slide back along these inclined surfaces until they again reach the starting position of FIG. 5 at complete relief, in which condition the spool shaft 17 and the roll 16 can follow by winding in either direction.

Figure 1:
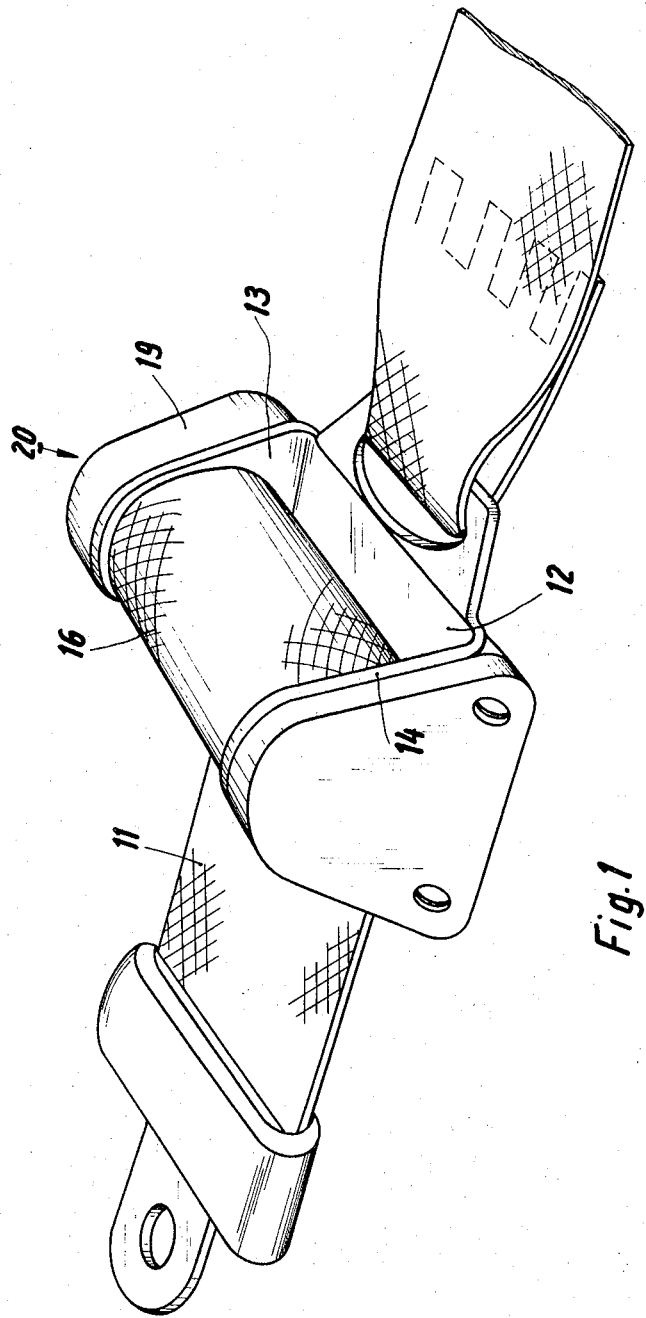
FIG. 1 is an isometric view of the winding device according to the present invention.
Figure 2:
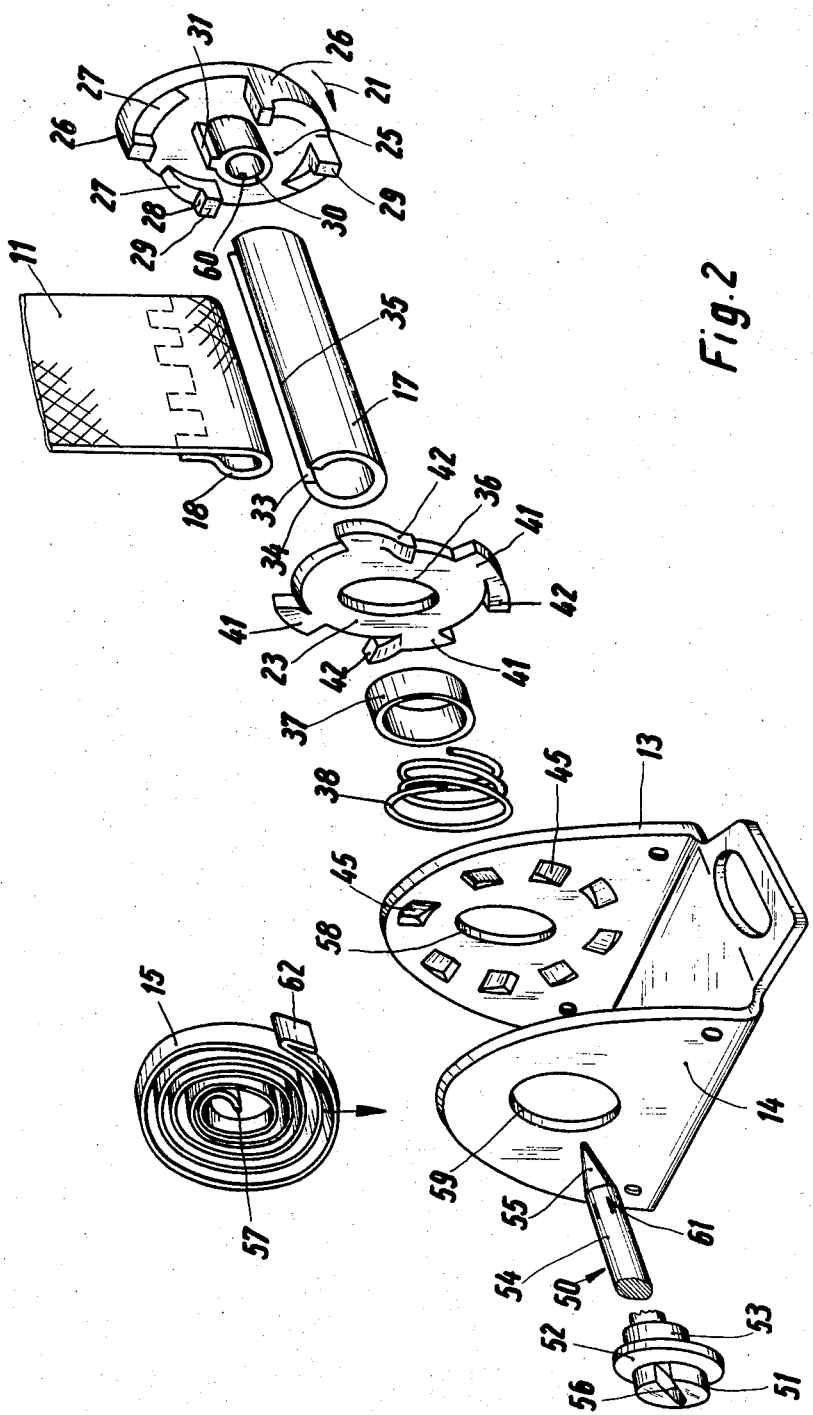
FIG. 2 illustrates an exploded view of the individual parts of the winding device according to the invention while the individual elements, however, are shown in a sequence which differs from the sequence in which the various elements are assembled.

In order to facilitate the assembly for the winding-up device in the described manner and its locking device, a central connecting bolt 50 is provided which according to FIG. 2 has a head 51, an abutment flange 52, a cylindrical extension member 53, and a shank 54 adjacent said extension member 53. The shank 54 ends in a conically pointed end section 55. Head 51 has a transversely extending cut 56 in which the angled-off inner end section 57 of the return spring 15 may be connected. During the assembly, the spacer sleeve 37 is placed onto the spool shaft 17 which is firmly connected to the supporting disc 25 whereupon the inertia disc 23 with its bore 36 is placed upon the spacer sleeve 37. Thereupon the spool shaft 17 is together with the subsequently mounted pressure spring 38 introduced into the bore 58 of the housing wall 13 and is, for journaling in the second housing wall 14, passed into the bore 59 which has the same diameter as the bore 58. Thereupon the loop 18 of the safety belt 11 can be passed through the longitudinal slot 33 into the hollow chamber of the spool shaft 17. In view of the loop 18, the connecting bolt 50 can easily be passed through with its conical end section 55 while the shank 54 braces the belt section located within the spool shaft 17 with regard to the bore wall of the spool shaft 17. The connecting bolt has its length so dimensioned that it extends into the supporting disc 25 and here can be clamped in the central longitudinal bore 60 of the connecting stud radially to its notch zone 61. The notch zone 61 is in the manner of a notched pin provided with a plurality of longitudinally extending notches which are located directly behind the conical member 55. In the assembled condition of FIG. 4, the extension member 53 will then tightly be located in the bore of the spool shaft 17 and will bring about that with regard to the journaling in bore 59 the hollow spool shaft 17 is able to be subjected to a load as if it were made of solid material, particularly inasmuch as the bore 59 safely prevents a widening of the longitudinal slot 33. The longitudinal edges 34 and 35 of this longitudinal slot are advantageously in order to save the belt 11 interrupted or are embossed in such a way that no cutting of the belt will occur.

Also, the second bearing area in bore 58 acts like a massive formation of the spool shaft 17 because here the extension 30 of the supporting disc 25, supports the spool shaft 17 as shown in FIG. 4, and in its turn is clamped to the shaft 54 of the connecting bolt 50.

During the assembly, the return spring 15 is finally with its inner end section 57 inserted into the cut 56 of the connecting bolt 50 and with its outer hook-shaped bent end section 62 is inserted into a follower web (not shown in the drawing) in cap 63 which is firmly connected to the housing wall 14 by riveting.

FIG. 9 shows a modification for the inertia disc 70 which, in contrast to the inertia disc 23 of FIG. 8, is provided for outer centering. To this end the radially extending arms 71 are connected to each other by a closed circular marginal area 72 which for outer centering is, by its mantle surface 73, slidably guided in a suitable bore.

According to the further modification for an inertia disc 80 according to FIG. 10, an outer ring 82 as well as an inner ring 83 are provided which interconnect the radial arms 81 respectively provided with saw-tooth-shaped locking noses 84, and which permit an inner centering as well as an outer centering. The weight ratios of the inertia disc may as to mass by their shape be so determined that a precalculated acceleration value will be realized when initiating the locking operation.

Housing 20 may also be arranged on a support which is connected to the chassis. Furthermore, the housing may have associated therewith a mass pendulum in such a way that in response to changes in the acceleration of the vehicle the inertia disc will by means of a locking pawl be prevented from further rotation, which pawl is operatively connected to the mass pendulum and is preferably spring loaded. In this instance it is expedient to design the inertia disc with an increased diameter so that it will protrude beyond the supporting disc of smaller diameter so that the protruding arms of the inertia disc at the same time form the locking cams for the pawl.

In order to maintain the influence of the friction which occurs while the inertia disc 23 slides along the inclined surfaces 27, as low as possible, the end height $e$ of the inclined surfaces as measured in axial direction may be approximately of the same magnitude as the axial protrusion $a$ of the locking teeth 42 on the inertia disc 23, said axial extension being measured relative to the disc surface 43.

With the second embodiment shown developed in FIG. 11, the inertia disc 23 is provided with a plurality of balls 90 which serve as rolling bodies and are respectively arranged in a cylindrical recess 91 in each of the arms 41 where they are guided. As a result thereof, the friction between the inertia disc 23 and the supporting disc 25 is considerably reduced. In view of this reduction in friction, it is possible to preload pressure spring 38 to a correspondingly greater extent and thereby considerably to reduce the influence exerted by the weight of the inertia disc 23 upon the response precision.

Experience has shown that the weight of the inertia disc 23 has no influence when the winding-up device is in its position of use in which the axis of rotation of the spool shaft 17 and consequently also of the supporting disc 25 and the inertia disc extends horizontally. If, however, the axis of rotation extends vertically, the limit value of the rotary acceleration at which the locking device responds, greatly depends on whether the inertia disc 23 is located above the stationary arresting noses 45 or is below the same. In the last mentioned instance, the pressure spring 38 which has the tendency to hold the inertia disc out of engagement with the arresting noses is by the weight of the inertia disc so supported that the locking device will only respond at considerably higher acceleration values than in the other extreme position in which the inertia disc is located above the locking noses 45. At the same value of the limit acceleration, it is possible in view of the rolling body arrangement and in view of the thereby greatly reduced friction for the pressure spring, to provide a considerably higher preload and to reduce the location dependency considerably.

For purposes of further reducing the friction, with the third embodiment shown in part and greatly enlarged in FIG. 12, the ball 90 rolling on the inclined surface 27 is supported by a smaller diameter supporting ball on which the larger ball 90 can likewise roll. With the embodiment according to FIG. 13, at the bottom 93 of the recess 91 for receiving the ball 90 there is in the manner of a thrust bearing provided a plurality of smaller supporting balls 92 of considerably smaller diameter, preferably three or more supporting balls.

According to the fifth embodiment of the invention illustrated in FIGS. 14 and 15, each of the arms 41 of the inertia disc 23 shown in axial top view, has a cut 95 which extends parallel to the axis of rotation. In said cut 95, there are respectively rotatably journaled roller bodies which are designed in the form of small discs 96.

With the embodiments described in greater detail further below, an auxiliary mass disc is provided for reducing the location sensitivity. This auxiliary mass disc illustrated in FIGS. 16 to 27 is, in spite of slight structural deviations, designated throughout with the number 100. Inasmuch as structural elements are employed which coincide to those of the above described embodiments, they are designated with the same reference numerals as in the preceding figures. The auxiliary mass disc 100 is with both embodiments located on that side 101 of the supporting disc 25 which faces away from the inertia disc 23 and is rotatably journaled on a pivot 102 which represents an extension of the central connecting bolt 50, protrudes beyond the supporting disc 25 and has a smaller diameter than the connecting bolt 60. In order to assure the desired operative connection between the inertia disc 23 and the auxiliary mass disc 100, the latter is equipped with a follower pin 104 which is pressed into a bore near its circumferential surface, and furthermore is equipped with a follower pin 105 diametrically oppositely located to the pin 104. These two follower pins respectively extend through a recess 106 and 107 at the rim of the supporting disc 25 and extend into two receiving bores 108 and 109 respectively arranged in two arms 41 of disc 23 which are located opposite to each other.

The taking along of the auxiliary mass disc 100 is effected exclusively by friction which occurs with the engagement of the supporting disc 25 by the auxiliary mass disc 100 or when in the position of the axis of rotation of the spool shaft 17 in FIG. 17 the disc 100 under the influence of its weight engages a follower ring 110 on the end section of the pivot 102. In order to be able to compensate for the above mentioned influence depending on the respective position of use and exerted by the weight of the inertia disc upon the response value of the blocking device, it is suggested that with the arrangement illustrated in FIGS. 16 – 18, the frictional taking along moment exerted upon the mass disc 100 on the end face 101 of disc 25 when the disc 100 is located above the supporting disc, be selected considerably greater than in the second extreme position of use illustrated in FIG. 17. This considerably greater taking along moment is created by a hub 112 which forms one piece with the disc 100, the outer diameter of hub 112 being considerably greater than the outer diameter of the follower ring 110 so that in view of the greater effective lever arm with regard to the axis of rotation, a considerably greater follower friction moment is created than is possible with the engagement of the disc 100 on the follower ring 110 as illustrated in FIG. 17. In the illustrated position thus the disc 100 will already at a considerably lower rotary acceleration values of the spool shaft 17 and consequently at smaller belt withdrawal accelerations slip through in view of its mass inertia and will then hold fast disc 23 relative to the further turning supporting disc 25 which then is controlled by the supporting disc 25 to move between the noses 45 on the housing wall 13. In this way it will be assured that with a proper dimensioning of the two frictional surfaces on the end face of hub 112 and on the end face side of the follower ring 110, the above mentioned influence of the weight of the inertia disc 23 can be compensated for.

The embodiment illustrated in FIGS. 16 – 18 will permit a relatively simple assembly because the follower ring can easily be fixed on stud 102 by means of a clamping yoke 114. Certain difficulties may, however, be encountered because during the manufacture of the individual elements relatively narrow tolerances have to be observed. This is not necessary with FIGS. 19 – 27.

With the last mentioned embodiment there exists the important difference over the previously described embodiments that the auxiliary mass disc 100 at that side thereof which faces the supporting disc 25 has a control cam 120 (clearly shown in FIG. 21) which is formed onto the hub 112 and cooperates with a control member 122 which is to a great extent independent of friction forces, but is spring loaded.

This control member 122 has an extension arm 124 in which an arc-shaped longitudinal slot 126 is recessed through which in a manner shown in FIGS. 19, 20, 24 and 26, a notched nail 128 extends. This nail on one hand permits the control member 122 to radially pivot outwardly and thus makes it possible that a control tooth 130 located on the control member 122 meshes with one of eight gear strips or racks 131 which are located on the inner wall of a cover housing which extends over the disc 100, the disc 25 including the disc 23 and extend parallel to the axis of rotation of the spool shaft 17. In the unlocked position shown in FIG. 19, the control member 122 is held by a yoke-shaped return spring 133 which by means of an arm rests against a second notch nail 134 driven into the supporting disc 25 and is pivotable about a third notch nail 135 which is fixedly located in disc 25, said spring being under load pressing by a second arm against an extension 136 of the control member 122. As function important element, the control member 122 has a spring elastic finger 138 which is parallel to the axis of rotation of the spool shaft and forms one piece with the control member 122. The finger 138 extends through a recess 107 (similar to that of FIG. 18), on the circumference of the supporting disc 25 into a radial slot 139 on an arm 41 of the inertia disc 23 and thus prevents the inertia disc 23 from further turning when the limit value of the rotary acceleration has been reached and the control tooth 130 engages one of the tooth strips or racks 13. This occurs when after the limit acceleration value has been reached, the auxiliary mass disc 100 lags behind the supporting disc 25 and then with its control cam 120 presses outwardly the control member 122 which moves together with the supporting disc 25 in unwinding direction 21, until the control member 122 engages one of the tooth strips 131. In this position which is shown in FIG. 23 as a development, the locking noses 42 of the inertia disc 23 will by a play s (not illustrated to scale in the drawing and actually amounting only to from 0.5 to 1.0 millimeters) is located in front of the arresting noses 45 of the side wall 13 of the housing. Inasmuch as the locking noses 42 are not in contact with the locking noses 45, they cannot jam with these noses 45 when during the successive axial control movement the inertia disc 23 prevented by finger 138 from turning moves in axial direction against the locking noses 42 when the inertia disc moves onto the inclined surfaces 27 as shown in FIGS. 24 and 25. This engaging play s remains maintained also when the inertia disc reaches the end position shown in FIG. 25 at which the rear flank 47 of its arms 41 respectively engages the abutments 29 of the supporting disc 25.

From the precontrol position illustrated in FIG. 25, the inertia disc 23 then passes into the blocking or locking position shown in FIG. 27 in which the locking noses 42 firmly engage the stationary arresting noses of the housing wall 13 when the control member 122 held by the tooth strips 131 does not move on but in view of its longitudinal slot 126 of the supporting disc 25 makes it possible that this disc can move on in the withdrawal direction indicated by the arrow 21. In this connection the spring elastic finger 138 will bend and will permit the locking noses 42 of the inertia disc 23 fully to get into mesh with the arresting noses 25 of the side portion 13 of the housing.

The last mentioned embodiment has the important advantage that the limit value of the rotary acceleration effected in the withdrawal direction of the belt is practically independent from the occurring frictional forces and therefore can rathe precisely be determined by the preload of the leg spring 133.

When the winding-up device is fixedly connected to the chassis, the auxiliary mass disc 100 may have associated therewith a mass element so that during vehicle accelerations, the auxiliary mass disc 100 will by a corresponding locking lever be prevented from further rotating and will thus initiate the locking operation.

Expediently in this instance the circumference of the auxiliary mass disc is provided with small locking teeth. In this way a winding-up device is obtained with two locking initiating operations working independently of each other.

It is, of course, to be understood that the present invention is, by no means, limited to the particular showing in the drawings, but also comprises any modifications within the scope of the appended claims.

What is claimed is:

1. In combination with a winding device for a safety belt, a tubular spool formed by rolling up a piece of metal into cylindrical form embossed to have serrated edges thereof defining an axial slot connected to one end of the belt, a return spring biasing the spool in take up direction, a housing having a base and end walls upstanding from the base, the walls having bores of predetermined diameter receiving ends of said spool journaled thereby, and a locking device independently operatively interposed between said spool and said housing operable in response to acceleration of said spool in pay out direction to lock the spool to the housing, said locking device comprising a support disc fixed to one end of said spool outside one end wall of said housing, an inertia disc mounted loosely over said spool between said one end wall and said support disc for rotation in a plane perpendicular to the longitudinal axis of the spool and for sliding movement along the spool, axial cams on said support disc comprising surfaces inclined toward the inertia disc in a direction opposite to the pay out direction of rotation of said spool, said inertia disc being a stamping formed in star configuration and having radial arms adjacent said inclined surfaces which ride up said surfaces when the spool is accelerated in pay out direction, said radial arms each having at least one circumferential side being bent out of the plane of rotation of said inertia disc, first abutment noses on said one wall of said housing to abut one side of said arms when the arms ride up said inclined surfaces, and second abutment noses on said support disc at the upper ends of said inclined surfaces facing said first abutment noses and engageable with the other sides of said arms when the arms ride up said inclined surfaces, said first and second abutment noses being axially offset so as normally freely to pass by one another during rotation of said spool, a bolt extending axially through said spool and arresting the spool axially, said return spring being connected between one end of said bolt and said housing, one end of said bolt fitting closely into said spool relative to one wall of the housing, one end of said belt having a loop thereon which fits over said bolt, said spool being axially slotted to receive said belt, the shank end of said bolt extending to the vicinity of said support disc, said spool being hollow, said support disc having an extension fitting inside said spool, said extension extending into said spool to a location adjacent to the end wall of said housing, a spacer sleeve on said spool between said support disc and said one end wall of said housing, said inertia disc being mounted on said sleeve, and a conical spring between said one end wall and said inertia disc biasing said inertia disc toward said support disc, the axial extent of said inclined surfaces being equal to the axial extent of said radial arms of said inertia disc at the regions which cooperate with said abutment noses plus the axial spacing between said first and second abutment noses.

* * * * *